US 6,685,162 B2

(12) United States Patent  
Carpenter

(10) Patent No.: US 6,685,162 B2
(45) Date of Patent: *Feb. 3, 2004

(54) CONTROL VALVE HAVING MOVEABLE INLET AND OUTLET

(76) Inventor: Joseph Carpenter, 10700 Amber Ridge Dr., #201, Las Vegas, NV (US) 89134

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/519,869

(22) Filed: Mar. 6, 2000

(65) Prior Publication Data

US 2002/0066876 A1 Jun. 6, 2002

(51) Int. Cl.[7] ............................................... F16K 51/00
(52) U.S. Cl. ................................... 251/150; 239/133.11
(58) Field of Search .............................. 251/148, 150; 285/302, 133.11; 239/281

(56) References Cited

U.S. PATENT DOCUMENTS

| 1,553,164 A | * | 9/1925 | Hook ........................ 251/150 |
| 2,663,580 A | | 12/1953 | Shirk |
| 2,774,618 A | | 12/1956 | Alderson |
| 3,126,194 A | * | 3/1964 | Franck ....................... 251/148 |
| 3,356,332 A | * | 12/1967 | Phillipe ...................... 251/150 |
| 3,656,784 A | | 4/1972 | Dow |
| 3,826,521 A | | 7/1974 | Wilhelmsen |
| 3,894,718 A | * | 7/1975 | Koch et al. .................. 251/148 |
| 3,997,140 A | * | 12/1976 | Mullins .................... 251/148 X |
| 4,072,328 A | | 2/1978 | Elliott |
| 4,386,796 A | * | 6/1983 | Lyall et al. .............. 285/302 X |
| 4,650,529 A | | 3/1987 | Guest |
| 4,687,232 A | | 8/1987 | Zimmerman |
| 4,690,434 A | | 9/1987 | Schmidt |
| 4,776,617 A | | 10/1988 | Sato |
| 4,810,008 A | | 3/1989 | Brodie |
| 4,858,958 A | | 8/1989 | Harbeke |
| 4,932,686 A | * | 6/1990 | Anderson, Jr. .......... 285/302 X |
| 4,946,213 A | | 8/1990 | Guest |
| 4,981,280 A | | 1/1991 | Brandenberg |
| 5,024,469 A | * | 6/1991 | Aitken et al. ................ 285/302 |
| 5,316,264 A | * | 5/1994 | Newman, Sr. et al. ....... 251/150 |
| 5,323,813 A | | 6/1994 | Barrett |
| 5,524,935 A | * | 6/1996 | Everts ..................... 285/302 X |
| 5,553,900 A | * | 9/1996 | Fukumoto et al. ....... 251/148 X |
| 5,586,749 A | * | 12/1996 | Conley et al. .......... 251/148 X |
| 5,595,368 A | * | 1/1997 | Bogdany et al. ............. 251/148 |

* cited by examiner

Primary Examiner—Gene Mancene
Assistant Examiner—John Bastianelli
(74) Attorney, Agent, or Firm—Weide & Miller, Ltd.

(57) ABSTRACT

An improved control valve and method of installation thereof is disclosed. In one or more embodiments, the control valve comprises a housing having an inlet and an outlet, a passage leading from the inlet to the outlet through the housing, a control configured to selectively control the flow of material through the housing, and at least one extension associated with the housing for changing a position of the inlet and/or outlet of the valve. One or more embodiments of a method comprise providing a valve having an inlet or outlet with is adjustably positionable with respect to a remaining portion of the valve, changing a position of the inlet and/or outlet of the valve with respect to a remaining portion of the valve, and connecting the inlet and outlet of the valve to inlet and outlet pipes, respectively.

13 Claims, 2 Drawing Sheets

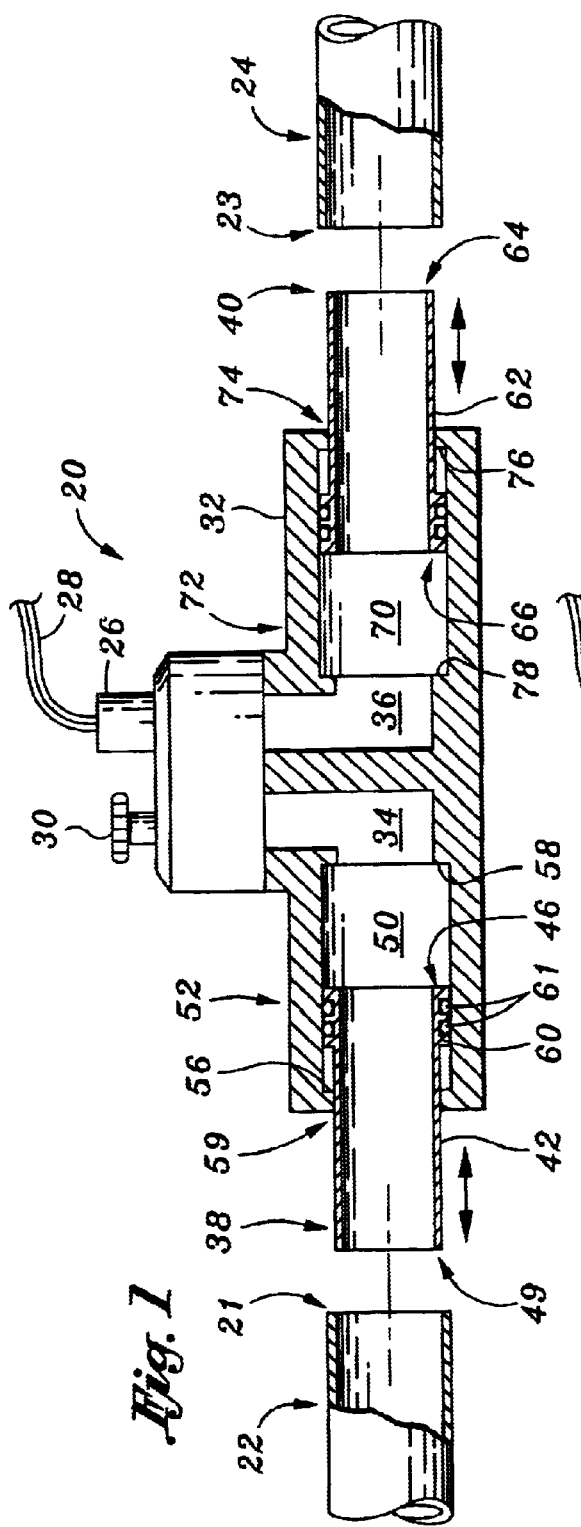
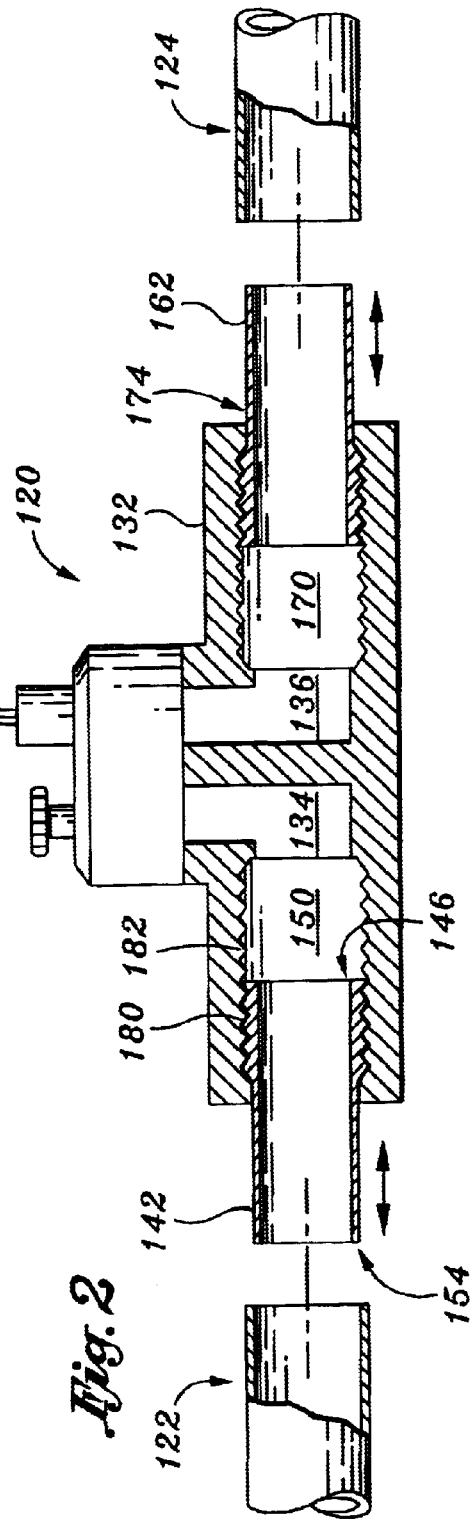

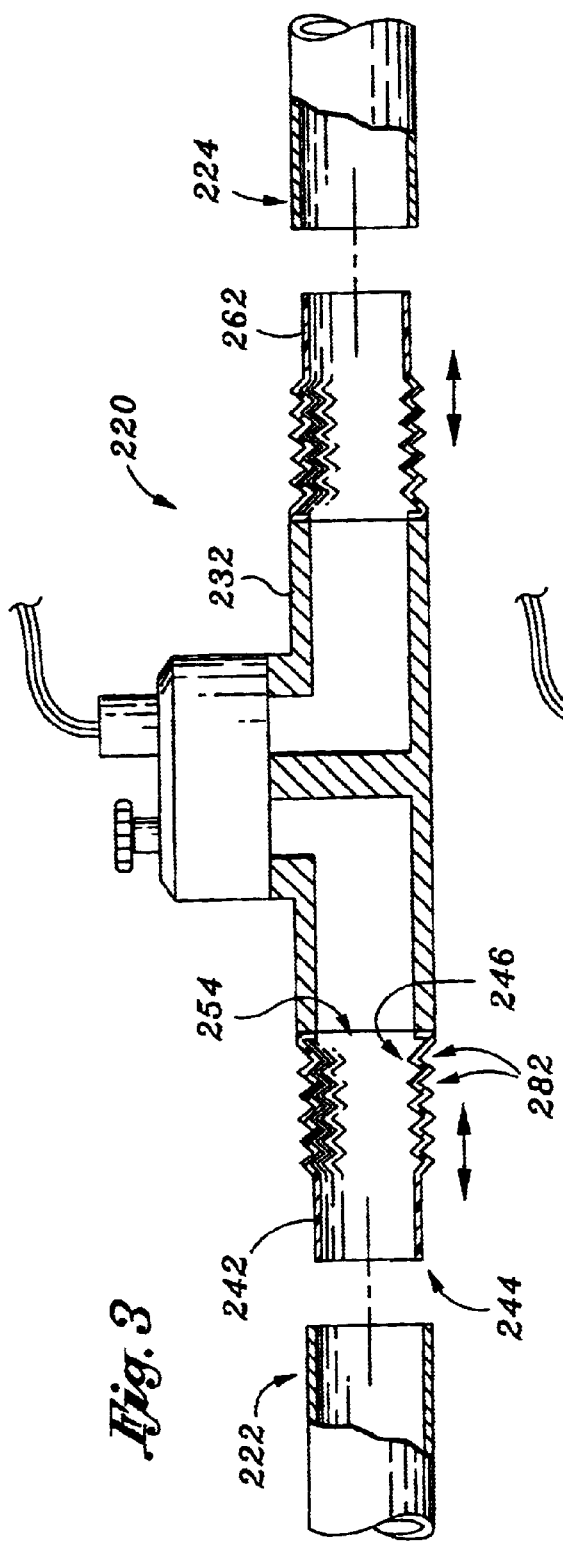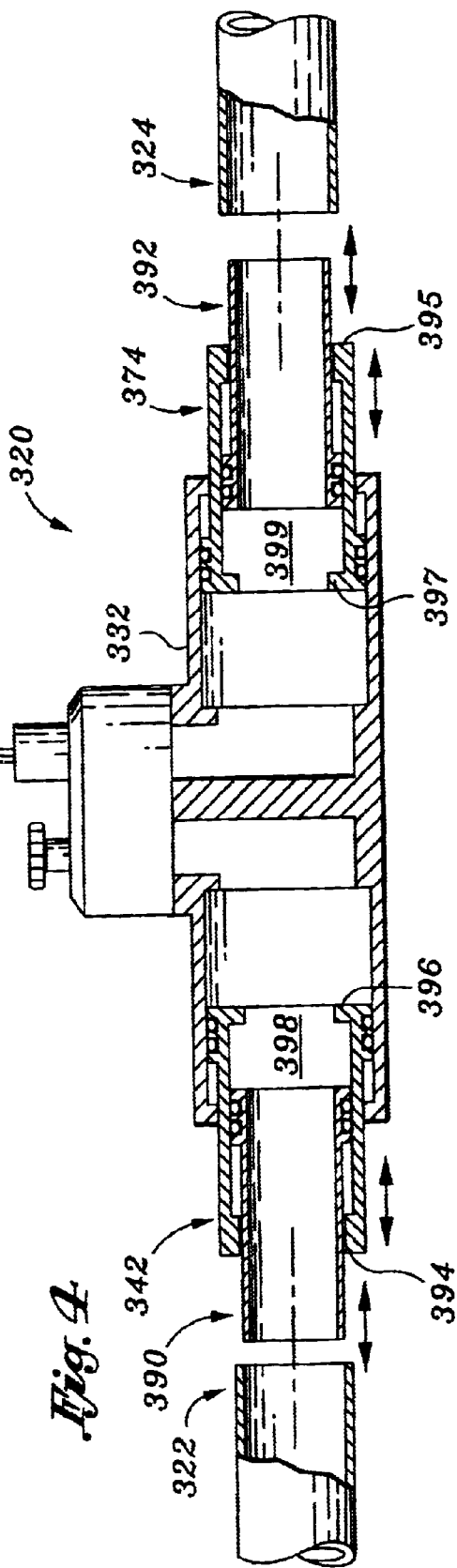

CONTROL VALVE HAVING MOVEABLE INLET AND OUTLET

FIELD OF THE INVENTION

The present invention relates to valves, especially those of the type used to control the flow of water in PVC piping systems.

BACKGROUND OF THE INVENTION

With the advent of PVC and similar piping systems, the installation and maintenance of piping systems has generally been made much easier and less costly. Such piping systems are commonly used in lawn sprinkler and similar applications. Unfortunately, there are several significant problems with these systems that still remain. One such problem is the installation, and especially replacement, of control valves associated with these systems.

In many water systems, a water valve or similar control is provided in-line along a run of piping. The water valve generally has a rigid housing defining an inlet and an outlet and is arranged to control the flow of water from the inlet to the outlet. The inlet and outlet may comprise smooth passages for receiving a pipe therein, or comprise an internally or externally threaded passage for connection of a rigid adaptor for connection to a pipe.

Removal of such a valve is quite easy, since the PVC piping may be easily cut. Generally, the piping is cut some distance from the inlet and outlet of the valve and then the valve is removed, leaving exposed pipe ends.

Installation of a new valve is then difficult. In order to install a new valve, the valve and a combinations of fittings and pipe extensions must be connected to span the space between and connect the two pipes. No matter what the configuration of components, however, because the components are arranged to engage in a slip-fit or other overlapping arrangement, at some point during the installation the problem arises that the distance between the pipe ends is less than the total length of the components which must be installed therebetween.

For example, in a common installation method, an adaptor is connected to the inlet and outlet of the valve. A shunt pipe segment is then slipped into the port of each adaptor. Next, the ends of the shunt pipe segments must be connected to the exposed pipe ends. This is accomplished with a connector or such as a slip fitting. A problem arises, however, in the fact that the shunt pipe segments and the exposed ends of the pipes must both be inserted or slip-fit into each connector by some distance in order for there to be no leaks or breaks. In other words, the straight-line distance between the ends of the shunt pipes extending from the valve along with the connectors is greater than the straight-line distance between the exposed ends of the pipe. This overlap distance may be on the order of 0.5 to 1 inch at each interconnection.

In a PVC pipe system, a common way to increase the distance between the components to be connected (for example the shunt ends of the pipes and their respective connectors) is to bend or flex the pipes. By bending both pipes so that they are not aligned, the distance between the last two components which must be interconnected to complete the installation may be increased. There are several problems with bending or flexing the pipe in order to mate or insert the pipe elements as described. A primary problem is that the piping is somewhat brittle and prone to breakage under bending stress. Thus, when a valve is replaced in a manner as described above, when the pipe is flexed, it may crack or break at another point along the system.

Another problem with the valve replacement method is that a substantial length of the pipe leading to and from the valve must be generally exposed in order to permit sufficient flexing. When the piping is buried, this may require digging up many feet of pipe. In a case where the piping is embedded in a wall, concrete or the like, substantial demolition and re-construction may be required.

Another problem is that the last two components may not properly seat when inserted at other than a direction of direct on-axis alignment. An adhesive is applied to an end of the pipe or other element to be inserted into the slip or other connector. When the pipe is inserted into the slip connector at an angle, the adhesive may cause the pipe to adhere to the slip connector before it is fully inserted therein and the pipes and other components are permitted to move into axial alignment. This may cause the connection to be weak and susceptible to leaks.

Although the above-described problems have been described with particular reference to PVC and similar plastic piping systems, it should be noted that similar problems arise when replacing a valve in other types of systems, such as those constructed from metal piping. In such systems, the option of bending the pipe to facilitate the connection may not be present, making the installation much more difficult.

It is desirable to provide a means by which a valve in a piping system may be easily installed and/or replaced, and which minimizes the number of necessary component parts.

SUMMARY OF THE INVENTION

In accordance with the present invention there is provided an improved control valve and a method of using such a valve.

In one or more embodiments, the control valve comprises a housing having an inlet and an outlet, a passage leading from the inlet to the outlet through the housing, a control configured to selectively control the flow of material through the housing, and at least one extension associated with the housing for changing a position of the inlet and/or outlet of the valve.

In one or more embodiments, the inlet and/or outlet is defined by an extension which slidably engages the housing of the valve. In one or more other embodiments, the inlet and/or outlet is defined by an extension which threadably engages the housing of the valve. In one or more embodiments, the inlet and/or outlet is associated with a member which expands and contracts.

One or more embodiments of a method comprise providing a valve having an inlet or outlet with is adjustably positionable with respect to a remaining portion of the valve, changing a position of the inlet and/or outlet of the valve with respect to a remaining portion of the valve, and connecting the inlet and outlet of the valve to inlet and outlet pipes, respectively.

Further objects, features, and advantages of the present invention over the prior art will become apparent from the detailed description of the drawings which follows, when considered with the attached figures.

DESCRIPTION OF THE DRAWINGS

FIG. 1 is a cross-sectional side view of an improved valve in accordance with an embodiment of the invention;

FIG. 2 is a cross-sectional side view of an improved valve in accordance with another embodiment of the invention;

FIG. 3 is a cross-sectional side view of an improved valve in accordance with another embodiment of the invention; and FIG. 4 is a cross-sectional side view of an improved valve in accordance with yet another embodiment of the invention.

DETAILED DESCRIPTION OF THE INVENTION

The invention is an improved valve and a method of using such a valve. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Referring to FIG. 1, there is illustrated an improved control valve 20 in accordance with an embodiment of the invention. The exact type of valve 20, including its environment of use, may vary. As illustrated, the valve 20 is of the type utilized to control the flow of water in a water system, such as a lawn sprinkler system. As illustrated, the valve 20 is shown for use in controlling the flow of water between a first pipe 22 and a second pipe 24.

As illustrated, the valve 20 is of the "automatic" type. Such valves 20 are well known. These valves 20 include solenoid 26 which operates upon a diaphragm (not shown) to open an close a control element (not shown). The control element controls the flow of water through the valve. The solenoid 26 is electrically operated, as by an electric signal provided by a pair of wires 28. The electric signal may be generated at a control unit, such as a sprinkler control/timer unit provided remote from the valve. A manual control 30 is provided for controlling the valve 20 at the location of the valve.

Those of skill in the art will appreciate that the valve 20 may comprise a variety of other types of control devices, such as a fully manually-operated valve. The particular manner by which the valve may operate may also vary. For example, the valve need not be of the solenoid operated type, but may be of the gate-type or other type now known or later developed. The valve 20 or other control device may be used in a variety of different settings and be used to control the flow of a variety of different types of materials, be it liquid, gas, slurry or the like.

The control valve 20 of the invention will now be described in more detail. As illustrated, the valve 20 has a housing 32. The housing 32 defines passage through which material, such as fluid, may be selectively permitted to flow. In one or more embodiments, the passage includes an inlet chamber 34 and an outlet chamber 36. The solenoid-operated valve element or other control means is arranged to control the flow of material from the inlet to the outlet chamber 34,36, and vice versa.

The control valve 20 has an inlet 38 and an outlet 40. In accordance with the present invention, the position of the inlet 38 is moveable with respect to the remaining portions of the valve 20, including the housing 32 and inlet chamber 34. Likewise, the position of the outlet 40 is moveable with respect to the remaining portions of the valve 20, including the housing 32 and the outlet chamber 36. In accordance with the embodiment of the invention, this effect is achieved by a means for changing a dimension of the valve 20, and more preferably, a means for changing a position of the inlet and/or the outlet with respect to the remaining portion of the valve 20. In the embodiment illustrated, this means comprises at least one extension element which is moveable with respect to the housing 32 of the valve 20.

As illustrated, an inlet extension 42 is movably mounted to the housing 32 of the valve 20. The inlet extension 42 comprises a hollow, tubular member. The inlet extension 42 has a first or free end 44 and an opposing second end 46. The free end 44 is positioned outside of the housing 32. The second end 46 is moveably mounted in a passage 50 defined by the housing 32.

As illustrated, the housing 32 has a first branch 52. The passage 50 is generally tubular in shape and extends from an opening 54 in the first branch 52 to the inlet chamber 34. The second end 46 of the inlet extension 42 is arranged to move along the passage 50. The inlet extension 42 extends from the passage 50 through the opening 54 in a direction outwardly from the housing 32.

Means are provided for limiting the movement of the inlet extension 42 with respect to the housing 56. In one or more embodiments, this means comprises at least one stop. As illustrated, a first stop 56 is positioned near the opening 54 in the housing 32. The first stop 56 is defined by a portion of the housing 32 which causes the opening 54 to have a size which is smaller than the adjacent passage 50. A second stop 58 is defined by the housing 32 at the intersection of the passage 50 and the inlet chamber 34, whereby the inlet chamber 34 has a slightly smaller dimension than the passage 50 at the intersection thereof.

The majority of the inlet extension 42 is sized to fit through the reduced dimension area defined by the housing 32 at the intersection of the opening 54 and the passage 50. The second end 46 of the inlet extension 42 has an area of increased dimension, in the form of an increased wall thickness area 60, for engagement with the first and second stops 56,58.

Means are provided for establishing a sealing relationship between the inlet extension 42 and the housing 32. This sealing relationship is designed to prevent the flow of material from within to outside the valve 20 via the interface between the inlet extension 42 and the housing 32 while still permitting the extension 42 to move with respect to the housing 32.

In one or more embodiments, this means comprises one or more seals 61. As illustrated, there are two seals 61, each seal comprising an "O"-ring element. The seals 61 are partially seated in channels provided on the increased wall thickness area 60 of the inlet extension 42.

As illustrated, an outlet extension 62 is movably mounted to the housing 32 of the valve 20. The outlet extension 62 comprises a hollow, tubular member. The outlet extension 62 has a first or free end 64 and an opposing second end 66. The free end 64 is positioned outside of the housing 32. The second end 66 is moveably mounted in a passage 70 defined by the housing 32.

As illustrated, the housing 32 has a second branch 72. The valve 20 may have a variety of configurations. In the configuration illustrated, the first and second branches 52,72 are aligned axially, but extend in opposing directions.

The passage 70 is generally tubular in shape, and extends from an opening 74 in the second branch 72 to the outlet chamber 36. The second end 66 of the outlet extension 62 is arranged to move along the passage 70. The outlet extension 62 extends from the passage 70 through the opening 74 in a direction outwardly from the housing 32.

Like the inlet extension 42, means are provided for limiting the movement of the outlet extension 62 with respect to the housing 32. As illustrated, this means comprises a first stop 76 and a second stop 78 similar to the first and second stop 56,58 associated with the passage 50. Likewise, the second end 66 of the outlet extension 62 has an area of increased dimension for engaging the stops 76,78. Further, means are provided for sealing the interconnection between the outlet extension 62 and housing 32, such as "O"-rings.

In accordance with this embodiment of the invention, the dimensions of the valve 20, and more particularly, the positions of the inlet and outlet 38,40, may be selectively adjusted. In particular, the inlet extension 42 may be moved from a retracted position to an extended position. When in the retracted position, the free end 44 of the inlet extension 42, and thus the inlet 38 of the valve 20, is positioned near the housing 32. When in the extended position, the free end 44 of the inlet extension 42, and thus the inlet 38 of the valve 20, is positioned farther from the housing 32 than when the inlet extension 42 is in its retracted position. Likewise, in the embodiment illustrated, the outlet extension 62 may be moved between retracted and extended positions, thus changing the position of the outlet 40. In the embodiment illustrated, the positions of the inlet and outlet extensions 42,62 may be moved to any position between the fully retracted and fully extended position.

The dimensions of the valve 20, including the inlet and outlet extensions 42,62, may vary dependent upon the particular application. In an embodiment where the valve 20 is of the type utilized in a lawn sprinkler application, it is preferred that the inlet and outlet extensions 42,62 be of a standard size, such as 0.5, 0.75 or 1 inch diameter. The range of movement for the inlet and outlet extensions 42,62 is primarily dependent upon the distance between the stops limiting the movement of the extensions. In one or more embodiments, it is preferable for the extensions 42,62 to each move by about 1–4 or more inches. The permitted travel may be varied as necessary.

It is preferable that when in its retracted position, each extension 42,62 extends from the housing 32 about 0.5 inches. This permits connection of another component to the inlet or outlet extension 42,62 when in its retracted position.

In one or more embodiments, the free end of either or both the inlet and outlet extension 42,62 may be enlarged. In this manner the free end may comprise a port for accepting another component, such as a pipe end. Alternatively, the free end may be sized to permit insertion into another component. For example, the free end may be of a diameter sized to fit into a slip connector for accepting a 1 inch diameter pipe, while the remainder of the extension may be smaller in diameter.

In general, it is desired that the interior of the extensions 42,62 be smooth and not change in dimension to reduce turbulence of the water or other material passing therethrough. As illustrated, the stops 58,78 are arranged so that when the inlet and outlet extensions 42,62 are retracted, a smooth pathway is formed through the extensions directly into the inlet and outlet chambers 34,36.

In one or more embodiments, the shape of the inlet and outlet extension 42,62 may be other than tubular/circular. In general, it is desirable for the inlet and outlet extension 42,62 be configured to mate with a component having any of a variety of shapes. For example, either or both extension may be generally square (in peripheral cross-section) to mate with a square connector. In such event, the passages 50,70 would preferably be similarly shaped.

The components of the valve 20 may comprise a wide range of materials. In a preferred embodiment, the housing 32 and the inlet and outlet extensions 42,62 are preferably constructed of PVC or similar material.

In one or more embodiments, the valve 20 may have only one port and/or only one port may be provided with a moveable extension. For example, the valve 20 may have an inlet 38 as described above (including an inlet extension 42) and an outlet comprising a vent or a standard fixed port.

It should be noted that the designations "inlet" and "outlet" are arbitrary. The valve 20 may be arranged to permit flow therethrough in one or both directions. In other words, the inlet and outlet may be reversed when considering the direction of fluid flow.

One or more embodiments of the invention comprise a method of use/installation of the control valve 20 of the present invention. Advantageously, the valve 20 of the invention may be installed in a new installation or to replace an existing valve.

If the valve 20 of the invention is used to replace an existing valve, the two pipes 20,22 leading to the existing valve are cut and the existing valve is removed. Whether the installation is a new installation or the replacement of an existing valve, there will be a free pipe end 21 of the first pipe 20 and a free pipe end 23 of the second pipe 24. Unlike prior arrangements, the pipes 20,22 may be cut very close to the valve which is being removed. This minimizes the amount of excavation which is necessary to replace the valve.

The valve 20 of the invention is placed between the free ends 21,23 of the pipes 22,24. The positions of the inlet and outlet extensions 42,62 are adjusted so that a connection is made between the inlet extension 42 and the first pipe 22 and the outlet extension 44 and the second pipe 24.

In an embodiment where the inlet and outlet extensions 42,62 are sized to fit within the end 21,23 of its respective pipe, the extensions are so inserted. In an embodiment where the inlet and outlet extensions 42,62 are designed to accept the pipes, the pipe ends 21,23 are inserted. The extensions 42,62 and the pipes 22,24 may then be thermally, sonically, or chemically bonded to prevent leaking.

In an arrangement where the inlet and outlet extensions 42,62 are sized approximately the same as the pipe 22,24 to which they are to be attached, the connection is preferably by a coupling. Such couplings are well known and generally comprise "slip-fit" sleeves. In such an arrangement a first end of the sleeve is fitted over the free end 21,23 of the pipe 22,24. The extension 42,62 is then slipped into the second opposing end of the sleeve. The interfaces between each extension and sleeve and each sleeve and pipe is sealed, such as by thermal, sonic or chemical bonding.

It will be appreciated that the valve 20 may be placed between and couple two pipes which are as close to one another as approximately the length of the housing 32 (between openings 54,75) of the valve 20. In such an arrangement, the inlet and outlet extensions 42,62 are moved inwardly to their retracted position in which they reside nearly entirely within the housing 22. On the other hand, the valve 20 may be placed between and couple two pipes which are a distance apart which is greater than the length of the housing 32. The maximum separation distance is equivalent to the length of the housing 32 plus the maximum extension distance of both extensions 42,62, less some overlap distance providing the coupling between the extensions and the pipes 22,24.

A control valve 120 in accordance with another embodiment of the invention is illustrated in FIG. 2. In general, this valve 120 is similar to that illustrated in FIG. 1 and described above. As such, similar components and arrangements will not be described in detail.

The valve 120 of this embodiment again includes a means for changing a dimension of the valve. This means comprises an inlet extension 142 and an outlet extension 162, both of which are moveable with respect to a housing 132 of the valve 120. As in the previous embodiment, the inlet extension 142 is moveably mounted in a passage 150 defined by the housing 132. The outlet extension 162 is moveably mounted in a passage 170 defined by the housing 132.

Means are provided for limiting or controlling the travel of the extensions 142,162 with respect to the housing 132. In one or more embodiments, this means comprises a threading inter-engagement of the extensions 142,162 with the housing 132. As illustrated, threads 180 are provided on the exterior of each extension 142,162. Mating threads 182 are defined on the housing 132 within the passages 150,170.

The threads 180,182 may be of a variety of types, sizes and styles, and such are well known in the art. Preferably, the threads 180,182 comprise mating continuous coil type. The means also include stops in the form of unthreaded areas of both the housing 132 and the extensions 142,162 beyond which travel of the extensions 142,162 is prevented. As illustrated, one stop is defined at the intersection of the first passage 150 with the inlet chamber 134, where inward movement of the inlet extension 142 is prevented by abutment of the second end 146 of the extension 142 with an unthreaded portion of the housing 132. A similar stop is defined at the intersection of the passage 170 and the outlet chamber 136. Another stop is defined at the mouth defining the opening 154 in the housing 132. Outward extension of the inlet extension 142 is limited by abutment of a threaded portion of the extension with the unthreaded portion of the housing 132 (the inlet extension 142 is illustrated in this position in FIG. 2). Likewise, a similar stop is defined at the outlet 174 for use in limiting the outward travel of the outlet extension 162.

In accordance with this embodiment of the invention, a user can change the dimensions of the valve 120 to accommodate its installation between two pipes having a varying distance apart. The user may adjust the position of the inlet and/or outlet of the valve 120 by moving the inlet extension 142 and/or the outlet extension 162.

Like the valve 20 described above, there are various configurations, constructions and arrangements of the valve 120 which may be provided other than that illustrated.

Use of this embodiment valve 120 is similar to that described above, except in the manner by which the extensions 142,162 are permitted to move, in that these extensions 142,162 move by manner of a threading engagement.

A control valve 220 in accordance with another embodiment of the invention is illustrated in FIG. 3. In general, this valve 220 has features similar to the valves 20,120 illustrated in FIGS. 1 and 2 and described above. As such, similar components and arrangements will not be described in detail.

The valve 220 of this embodiment again includes a means for changing a dimension of the valve, and more particularly a position of an inlet and/or outlet This means comprises an inlet extension 242 and an outlet extension 262, both of which are moveable with respect to a housing 232 of the valve 220.

In this embodiment of the invention, the inlet extension 242 is connected to the housing 232 at the opening 254, and in a sense forms a portion of the housing 232. As illustrated, the inlet extension 242 comprises a pipe member having an accordion section. The inlet extension 242 has one end 246 connected to the housing 232 and an opposing free end 244 for connection to a pipe 222 or other member.

An accordion portion of the inlet extension 242 between the connected and free ends 246,244 comprises a number of alternating "U" or "V"-shaped sections 282. These sections 282 allow the inlet extension 242 to be compressed (giving the extension 242 a short or reduced length) or expanded (giving the extension a long or increased length). The free end 244 of the inlet extension 242 is preferably uniform in diameter/shape so as to mate with a pipe 222 or other connector.

The outlet extension 262 is shaped similar to the inlet extension 242, but located at the opposing opening 272 of the valve 220.

The inlet and outlet extensions 242,262 may be constructed from a wide variety of materials. In one or more embodiments, the inlet and outlet extensions 242,262 are constructed from plastic, such as PVC or a similar material. In order to facilitate the extension and compression of the extensions 242,262, the accordion sections 282 may have a thinner wall thickness than the remaining portions of the extensions, or the sections may be constructed of different materials.

The inlet and outlet extensions 242,262 may be formed unitarily with the housing 232. In addition, the inlet and outlet extensions 242,262 may be formed separately from the housing 232 and be connected to the housing. The inlet and outlet extensions 242,262 may be removably connected to the housing 232. For example, the second end of the inlet and outlet extensions 242,262 may be arranged to slip-fit into the housing 232 of the valve 220 and be adhered thereto with adhesive or the like. The inlet and outlet extensions 242,262 may also be connected with threads or other means of connection.

In accordance with this embodiment of the invention, a user can change the dimensions of the valve 220 to accommodate its installation between two pipes having a varying distance apart. The user may adjust the position of the inlet and/or outlet of the valve 220 by moving the inlet extension 242 and/or the outlet extension 262.

Like the valve 20 described above, there are various configurations, constructions and arrangements of the valve 220 which may be provided other than that illustrated.

Use of this embodiment valve 220, such as in replacement of an old valve in a lawn sprinkler system, is similar to that described above, except in the manner by which the extensions 242,262 are permitted to move, in that these extensions 242,262 move by manner of extension and compression of the accordion sections 282.

A control valve 320 in accordance with another embodiment of the invention is illustrated in FIG. 4. In general, this valve 320 is similar to that illustrated in FIG. 1 and described above. As such, similar components and arrangements will not be described in detail.

The valve 320 of this embodiment again includes a means for changing a dimension of the valve, and more particularly a position of an inlet and/or outlet. This means comprises an inlet extension 342 and an outlet extension 362, both of which are moveable with respect to a housing 332 of the valve 320. The inlet and outlet extensions 342,362 are, in nearly all respects, similar in construction to those of the embodiment illustrated in FIG. 1.

In this embodiment, however, a nested inlet extension 390 is provided in association with the inlet extension 342. The nested inlet extension 390 is shaped similar to the inlet extension 42 illustrated in FIG. 1 and described above. The inlet extension 342 is shaped similar to the inlet extension 42 described above, except that it includes first and second stops 394,396 for limiting the travel of the nested inlet extension 390.

The first and second stops 394,396 are similar to the stops 56,58 of the housing 32 of the embodiment illustrated in FIG. 1, comprising portions of the inlet extension 242 which reduce a dimension of a passage 398 defined by the inlet extension 342 in which the nested extension 390 is partly positioned.

Likewise, a nested outlet extension 392 is provided in association with the outlet extension 362. The nested outlet extension 392 is shaped similar to the inlet extension 42 illustrated in FIG. 1 and described above. The outlet extension 362 is shaped similar to the outlet extension 62 described above, except that it includes first and second stops 395,397 for limiting the travel of the nested inlet extension 390.

The first and second stops 395,397 are similar to the stops 76,78 of the housing 32 of the embodiment illustrated in FIG. 1, comprising portions of the outlet extension 362 which reduce a dimension of a passage 399 defined by the outlet extension 362 in which the nested extension 392 is partly positioned.

The nested inlet and outlet extensions 390,392 are preferably sized, as with the extensions 42,62 illustrated in FIG. 1, to mate directly with a pipe 322,324, such as a commonly sized sprinkler pipe or extension. As such, the inlet and outlet extensions 342,362 and the portion of the housing 332 in which they are moveably positioned are enlarged to accommodate the nested inlet and outlet extensions 390,392, as will be appreciated by those of skill in the art.

In accordance with this embodiment of the invention, a user can change the dimensions of the valve 320 to accommodate its installation between two pipes having a varying distance apart. The user may adjust the position of the inlet and/or outlet connection of the valve 320 by moving the inlet extension 342, the nested inlet extension 390, the outlet extension 362 and/or the nested outlet extension 392.

Like the valve 20 described above, there are various configurations, constructions and arrangements of the valve 320 which may be provided other than that illustrated. In one or more embodiments, additional extensions may be further nested, such as three or four within one another.

Use of this embodiment valve 320, such as in the replacement of an old valve in a lawn sprinkler system, is similar to that described above, except that the maximum distance or change in position which may be accommodated by the extensions 342,362,390,392 may be greater than the valve 20 illustrated in FIG. 1 for extensions having similar dimensions and distances of travel (since the total distance of travel is generally then twice that illustrated in FIG. 1). On the other hand, the valve 320 may be arranged to that the travel of the extensions 342,362,390,392 is individually less than that of the embodiment illustrated in FIG. 1, but where the combined travel is approximately the same. In this arrangement, the valve 320 may be smaller (from end to end) when the extensions are in their retracted position while still providing the same change in position when extended.

Those of skill in the art will appreciate that other means may be provided for changing the position of the inlet and/or outlet of a valve other than that described above.

In all embodiments, the ends of the extensions may be arranged in a variety of manners to connect to another component. For example, the extension ends may be threaded to engage a threaded component, or have a smooth wall for slip-fitting into a component.

The present invention has numerous advantages. First, when installing or replacing another valve, only a small portion of the associated piping need be exposed—limiting the amount of necessary excavation. This is due to two factors primarily. First, very few components, if any, other than the valve need to be installed. In the prior art, the pipes had to be cut some distance back to accommodate a number of connectors and pipe shunts in order to form the necessary connection between the valve and the pipe. Second, the pipes do not need to be bent or flexed to permit the connection.

The valve of the invention is installed with the components in axial alignment. The valve is positioned and then the extension(s) extended in axial alignment with the pipe to which it is to be connected.

In most cases, the number of components necessary to install the valve is reduced as compared to the prior art. Generally, a direct connection can be made, or a connection with only a single slip connector.

Though the valve of the invention is particularly adapted to use in replacement, it can be installed in a new installation.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A method of installing a valve between an inlet and an outlet pipe comprising:

providing a valve having a housing defining a first portion of a passage through said valve, said valve including a first extendable member having a first end and a second end, said first end comprising a first port of said valve at a first end of said passage through said valve and said second end located within said housing and in communication with said first portion of said passage through said valve, said second end of said first extendable member movable within said housing, said first extendable member defining a second portion of said passage through said valve, said second portion of said passage defined by said first extendable member between said first port to said first portion of said passage through said housing, said valve including a second port at an opposing end of said passage through said valve and said first port, the length of said passage through said valve being adjustable in length by moving said first extendable member relative to said housing, said valve including a control configured to selectively open and close said passage through said valve from said first port to said second port, said first extendable member permanently coupled to said housing;

moving said first end of said first extendable member within said housing whereby said position of said second port of said valve is changed; and connecting said first port and second port of said valve to said inlet and outlet pipes, respectively including providing said valve with a second extendable member having a first end and a second end, said first end comprising said second port of said valve and said second end located within said housing and in communication with said second portion of said passage through said valve, said second end of said second extendable member movable within said housing, said second extendable member defining a third portion of said passage through said valve, said third portion of said passage defined by said second extendable member between said second port and said first portion of said passage through said housing and said second extendable member permanently coupled to said housing, and wherein said moving step comprises moving either or both of said first and second extendable members with respect to said housing whereby said positions of said first and second ports are changed.

2. The method in accordance with claim 1 wherein said moving step comprises sliding said first extension with respect to said housing.

3. The method in accordance with claim 2 wherein said sliding is accomplished by pulling or pushing said extension.

4. An adjustable control valve adapted to be located between a pair of piping elements which may be of various distances apart, said valve comprising a housing defining a first portion of a passage through said valve, said valve including a first extendable member having a first end and a second end, said first end comprising a first port of said valve at a first end of said passage through said valve and said second end located within said housing and in communication with said first portion of said passage through said valve, said second end of said first extendable member movable within said housing, said first extendable member connected to said housing so that it may not be disconnected from said valve, said first extendable member defining a second portion of said passage through said valve, said second portion of said passage defined by said first extendable member between said first port and said first portion of said passage through said housing, said valve including a second port at an opposing end of said passage through said valve from said first port, the length of said passage through said valve being adjustable in length by moving said first extendable member relative to said housing, and said valve including a control configured to selectively open and close said passage through said valve from said first port to said second port said first end comprising said second port of said valve and said second end located within said housing and in communication with said second portion of said passage through said valve, said second end of said second extendable member movable within said housing, said second extendable member connected to said housing so that it may not be disconnected from said valve, said second extendable member defining a third portion of said passage through said valve, said third portion of said passage defined by said second extendable member between said second port and said first portion of said passage through said housing.

5. The control valve in accordance with claim 4 wherein said first and second ports are positioned at opposing ends of said valve.

6. The control valve in accordance with claim 4 wherein said second end of said first extension is slidably mounted within said housing.

7. The control valve in accordance with claim 6 wherein said second end of said first extension is slidably mounted in a part of said first portion of said passage through said valve defined by said housing.

8. The control valve in accordance with claim 4 including at least one seal for sealing a space between said second end of said first extension and said housing.

9. The control valve in accordance with claim 4 including means for limiting the movement of said second end of said first extension with respect to said housing.

10. The control valve in accordance with claim 4 wherein said first portion of said passage of said valve defined by said housing has a first enlarged part adjacent to said first end of said valve and said second end is located in said enlarged part of said first portion of said passage.

11. The control valve in accordance with claim 10 wherein a first wall is defined at an interface between said first enlarged part of said first portion of said passage and a remaining portion of said passage within said housing, said interface comprising a first stop limiting the distance by which said second end of said first extension may be extended into said housing, and including a second stop at an opposing end of said first enlarged part, said second stop limiting the distance by which said second end of said first extension may be extended from said housing.

12. The control valve in accordance with claim 4 wherein said first extendable member has a first portion extending from said first end to said second end having a generally uniform diameter and wherein said second end has a diameter greater than said first portion.

13. The control valve in accordance with claim 12 wherein said first portion of said first extendable member extends through an opening of a first dimension in said housing and said second end of said first extendable member is located in a part of said first portion of said passage defined by said housing, said part having a second dimension greater than said first dimension, whereby said first extendable member can not be extended outwardly and separate from said housing.

* * * * *

UNITED STATES PATENT AND TRADEMARK OFFICE
CERTIFICATE OF CORRECTION

PATENT NO. : 6,685,162 B2
DATED : February 3, 2004
INVENTOR(S) : Joseph Carpenter It is certified that error appears in the above-identified patent and that said Letters Patent is hereby corrected as shown below:

<u>Column 11,</u>
Line 44, after the first instance of the word "port", please insert -- wherein said valve includes a second extendable member having a first end and a second end, --

Signed and Sealed this

Fourth Day of May, 2004

JON W. DUDAS
*Acting Director of the United States Patent and Trademark Office*